United States Patent
Molin et al.

(10) Patent No.: US 10,382,124 B2
(45) Date of Patent: Aug. 13, 2019

(54) METHOD FOR SELECTING WIDE-BAND MULTIMODE FIBERS FROM A SINGLE WAVELENGTH CHARACTERIZATION

(71) Applicant: Draka Comteq BV, Amsterdam (NL)

(72) Inventors: Denis Molin, Paron (FR); Koen De Jongh, Eindhoven (NL); Marianne Bigot, Paron (FR); Pierre Sillard, Paron (FR)

(73) Assignee: DRAKA COMTEQ B.V., Amsterdam (NL)

(*) Notice: Subject to any disclaimer, the term of this patent is extended or adjusted under 35 U.S.C. 154(b) by 0 days.

(21) Appl. No.: 15/778,709

(22) PCT Filed: Dec. 7, 2015

(86) PCT No.: PCT/IB2015/002448
§ 371 (c)(1),
(2) Date: May 24, 2018

(87) PCT Pub. No.: WO2017/098297
PCT Pub. Date: Jun. 15, 2017

(65) Prior Publication Data
US 2018/0359025 A1 Dec. 13, 2018

(51) Int. Cl.
*G02B 6/02* (2006.01)
*G01M 11/00* (2006.01)
(Continued)

(52) U.S. Cl.
CPC ..... *H04B 10/0775* (2013.01); *G01M 11/3163* (2013.01); *G01M 11/338* (2013.01);
(Continued)

(58) Field of Classification Search
CPC .............. G02B 6/0288; G02B 6/02214; H04B 10/0775; G01M 11/3163; G01M 11/338
(Continued)

(56) References Cited

U.S. PATENT DOCUMENTS 4,286,979 A * 9/1981 Buckler ............ C03B 37/0253
356/73.1
6,434,309 B1 8/2002 Abott et al.
(Continued)

FOREIGN PATENT DOCUMENTS

EP 2144096 A1 1/2010
WO 2014/179249 A1 11/2014
WO WO 2017103639 A1 * 6/2017 .......... G01M 11/338

OTHER PUBLICATIONS

International Preliminary Report on Patentability dated Jun. 12, 2018 in International Patent Application No. PCT/IB2015/002448 (8 pages).
(Continued)

*Primary Examiner* — Gordon J Stock, Jr.
(74) *Attorney, Agent, or Firm* — Shumaker, Loop & Kendrick, LLP (57) ABSTRACT

A method for selecting wide-band multimode optical fibers from a single wavelength, the method comprising the following steps of, for each multimode optical fiber obtaining a first DMD plot using a measurement of DMD carried out at a first single wavelength, obtaining from the first DMD plot, a first multimode fiber specification parameter; and for each fiber: obtaining from the first DMD plot, a curve representative of a radial offset delay, called ROD curve, as a function of the radial offset value; applying a linear fit on the ROD curve for at least two radial offset value ranges; obtaining from the linear fit and for each radial offset value range, an average radial offset delay slope, called ROD slope; selecting the multimode optical fibers meeting a first predetermined specification criterion for the first multimode fiber performance parameter, and for which the at least two computed ROD slopes meet a predetermined slope criterion.

30 Claims, 8 Drawing Sheets

(51) Int. Cl.
 *G02B 6/028* (2006.01)
 *H04B 10/077* (2013.01)
 *H04B 10/2581* (2013.01)
(52) U.S. Cl.
 CPC ....... *G02B 6/0288* (2013.01); *G02B 6/02214* (2013.01); *H04B 10/2581* (2013.01)
(58) Field of Classification Search
 USPC ........................................................ 356/73.1
 See application file for complete search history.

(56) References Cited

U.S. PATENT DOCUMENTS

| | | | | |
|---|---|---|---|---|
| 8,274,647 | B2* | 9/2012 | Gholami | G02B 6/0288 356/73.1 |
| 8,351,027 | B2 | 1/2013 | Pimpinella et al. | |
| 8,547,541 | B2* | 10/2013 | Achten | G01N 21/84 356/73.1 |
| 9,377,579 | B2* | 6/2016 | Molin | G02B 6/0288 |
| 9,871,584 | B2* | 1/2018 | Molin | G01M 11/332 |
| 10,241,003 | B2* | 3/2019 | Achten | G01M 11/338 |
| 2017/0097282 | A1* | 4/2017 | Achten | G02B 6/0288 |
| 2017/0176285 | A1* | 6/2017 | Molin | G01M 11/338 |
| 2017/0205311 | A1* | 7/2017 | Achten | G01M 11/338 |
| 2017/0331549 | A1* | 11/2017 | Molin | H04B 10/0731 |
| 2019/0011633 | A1* | 1/2019 | Molin | G01M 11/338 |

OTHER PUBLICATIONS

International Search Report dated Aug. 30, 2016 for International Patent Application No. IB2015/002448 (3 pages).
Written Opinion dated Aug. 30, 2016 for International Patent Application No. IB2015/002448 (7 pages).
Telecommunications Industry Association Document No. TIA-455-220-A "Differential Mode Delay Measurement of Multimode Fiber in the Time Domain" (34 pages).
Molin et al., "WideBand OM4 Multi-Mode Fiber for Next-Generation 400 Gbps Data Communications," ECOC 2014 (3 pages).
Sengupta, "Calculated Modal Bandwidths of an OM4 Fiber and the Theoretical Challenges," Proceedings of the 58th IWCS/IICIT, Dec. 31, 2009 (3 pages).
ISO/IEC 11801.
TIA/EIA 492AAAD.

* cited by examiner

METHOD FOR SELECTING WIDE-BAND MULTIMODE FIBERS FROM A SINGLE WAVELENGTH CHARACTERIZATION

1. FIELD OF THE INVENTION

The present invention relates to the field of optical fiber transmissions, and more specifically, to multimode optical fibers used in relative long reach and high bitrate systems.

More specifically, the invention relates to a method for selecting wide-band multimode fibers from a single wavelength characterization.

Throughout the present document, wide-band multimode fiber is understood as a multimode fiber having an operational wavelength range larger than 20 nm, in particular but not exclusively, an operational wavelength range comprised between 850 nm and 950 nm.

The invention is applied, in particular but not exclusively, to wide-band OM4 multimode fibers.

2. TECHNOLOGICAL BACKGROUND

Multimode fibers have constantly evolved from the very beginning of optical communications industry through the recent and on-going explosion of the Ethernet traffic. Enabled by VCSEL technology, high-speed multimode optical fibers, such as OM4 fibers (which are laser-optimized, high bandwidth 50 µm multimode fibers, standardized by the International Standardization Organization in document ISO/IEC 11801, as well as in TIA/EIA 492AAAD standard), have proved to be the medium of choice for high data rate communications, delivering reliable and cost-effective 10 to 100 Gbps solutions. The combination of Wide-Band (WB) multimode fibers with longer-wavelengths VCSELs for Coarse Wavelength Division Multiplexing (CWDM) is an interesting option to be considered in order to meet the future increase of demand.

However, the high modal bandwidth of OM4 fibers has until now only been achieved over a narrow wavelength range (typically 850 nm+/−10 nm). The feasibility of Wide-Band (WB) multimode fibers satisfying OM4 performance requirements over a broader wavelength range is a challenge to overcome for next generation multimode systems.

The OM4 fiber performance is usually defined by an Effective Modal Bandwidth (EMB) assessment at a given single wavelength. For instance, OM4 fibers should exhibit EMB larger than 4,700 MHz-km at a wavelength of 850 nm. The achievement of such high EMB values requires an extremely accurate control of refractive index profile of multimode fibers. Up to now, traditional manufacturing process cannot guarantee so high EMB, and generally it is hard to accurately predict the EMB values from refractive index profile measurements on core rod or cane, especially when high EMB (typically larger than 2,000 MHz-km) are expected, meaning the fibre refractive index profile is close to the optimal profile. As a matter of fact, EMB are directly assessed on fibers.

In order to minimize modal dispersion, the OM4 fibers generally comprise a core showing a refractive index that decreases progressively going from the center of the fiber to its junction with a cladding. In general, the index profile is given by a relationship known as the "α profile", as follows:

$$n(r) = n_0 \sqrt{1 - 2\Delta\left(\frac{r}{a}\right)^\alpha} \text{ for } r \leq a,$$

where:
- $n_0$ is a refractive index on an optical axis of a fiber;
- $r$ is a distance from said optical axis;
- $a$ is a radius of the core of said fiber;
- $\Delta$ is a non-dimensional parameter, indicative of an index difference between the core and a cladding of the fiber; and
- $\alpha$ is a non-dimensional parameter, indicative of the general shape of the index profile.

The Alpha parameter (α) that governs the shape of this graded-index core can be tuned to maximize the modal bandwidth at 850 nm of OM4 multimode fiber, the typical operating wavelength of high-speed data communications. A given alpha parameter value is generally selected to offer an optimum EMB as illustrated in document "WideBand OM4 Multi-Mode Fiber for Next-Generation 400 Gbps Data Communications" by Molin et al. ECOC 2014.

The Effective Modal Bandwidth (EMB) is assessed by a measurement of the delay due to the modal dispersion, known under the acronym DMD for "Dispersion Modal Delay" graphical representation. It consists in recording pulse responses of the multimode fiber for single-mode launches that radially scan the core. It provides a DMD plot that is then post-processed in order to assess the minimal EMB a fiber can deliver at a given wavelength. The DMD measurement procedure has been the subject of standardization (IEC 60793-1-49 and FOTP-220) and is also specified in Telecommunications Industry Association Document no. TIA-455-220-A. Each DMD metric, or DMD value, is expressed in units of picoseconds per meter (ps/m). It determines the delay between the fastest and the slowest pulses traversing the fibre considering a collection of offset launches normalized by fiber length. It basically assesses a modal dispersion. Low DMD value, i.e. low modal dispersion as measured by DMD generally results in higher EMB.

Basically, a DMD graphical representation is obtained by injecting a light pulse having a given wavelength at the center of the fiber and by measuring the pulse delay after a given fiber length L, the introduction of the light pulse of a given wavelength being radially offset to cover the entire core of the multimode fiber. Individual measurements are thus repeated at different radial offset values so as to provide cartography of the modal dispersion of the examined multimode fiber. The results of these DMD measurements are then post-processed to determine an effective transfer function of the optical fiber, from which a value of EMB may be determined.

Nowadays, all multimode fibre manufacturers perform DMD measurements and EMB assessment at a single wavelength only of their whole production: typically at 850 nm+/−2 nm for OM4 qualification and at 850 nm+/−10 nm for OM3 qualification.

With the advent of new multimode fibre application, requiring high EMB over a wide operating window, one of the main concerns of the multimode fibre manufacturers is to have the ability to easily assess the EMB over a wide wavelength range, for example between 850 nm and 950 nm.

Using the aforesaid classical measurement procedure (comprising a series of DMD measurements and an EMB assessment at a single wavelength) to assess the optical fiber's EMB over a range of wavelengths, i.e. at a plurality of wavelengths, would require performing several measurement procedures at said wavelengths adequately spread over the wavelength range of interest. However, making distinct independent DMD measurements to qualify the optical fiber's EMB at multiple wavelengths greatly leads to increase measurement time and the cost of measuring and producing wide-band multimode fibers. Such a solution would notably require implementation of several light sources each emitting in a distinct wavelength and several corresponding detectors, which would represent a complex and costly operation.

Therefore, there remains a need for a simple and low-cost method for identifying during production multimode fibers that guarantee high modal bandwidth over a wide wavelength spectrum only from a single wavelength characterization.

The U.S. Pat. No. 8,351,027 proposes to use a metric derivable from DMD measurement in combination with industry-standard metrics such as Effective Modal Bandwidth and DMD to obtain a more accurate prediction of multimode fibre channel link performance as measured by BER testing. The metric can be used to select or verify fiber performance at a wavelength close to the wavelength of the DMD measurements.

The invention provides in at least one embodiment a method that enables to guarantee the EMB of a wide-band multimode fiber over a relatively large spectral window while characterization is restricted to a single wavelength.

In another at least one embodiment the invention provides a method for selecting wide-band multimode fibers from a batch of multimode fibers that is simple to implement and that reduces multimode fiber measurement costs.

4. SUMMARY OF THE INVENTION

A particular embodiment of the invention proposes a method for selecting wide-band multimode optical fibers from a single wavelength, the method comprising the following steps of, for each multimode optical fiber:
- obtaining a first DMD plot using a measurement of dispersion modal delay carried out on said multimode optical fiber at a first single wavelength, the DMD plot comprising a plurality of traces each recorded at a different radial offset value r, from an axis of said multimode optical fiber where r=0 to a radial offset value r=α, where a is the core radius of said multimode optical fiber,
- obtaining, from the first DMD plot, at least one first multimode fiber specification parameter at said single wavelength;

and for each multimode optical fiber:
- obtaining, from the first DMD plot, a curve representative of a radial offset delay of said multimode optical fiber, called ROD curve, as a function of the radial offset value r, $0 \leq r \leq \alpha$;
- applying a linear fit on the ROD curve for at least one radial offset value range;
- obtaining, from said linear fit applied for each radial offset value range, a radial offset
- selecting the multimode optical fibers meeting a first predetermined specification criterion for said at least one first multimode fiber performance parameter, and for which said at least one computed ROD slope meets at least one predetermined slope criterion.

The general principle of the invention relies on using parameters of slopes computed on a curve representative of radial offset delay of multimode fibers to deduct the wide-band probable behavior of these fibers from a simple DMD characterization carried out at a single wavelength.

A ROD slope is defined as being the slope given by the linear fit. The linear fit applied to the ROD curve approximates the ROD curve over specific radial offset ranges by means of an affine function for instance.

According to a particular feature, for each predetermined slope criterion, a slope condition is verified for a computed ROD slope and/or a set of at least two computed ROD slopes of said at least one computed ROD slope, said slope condition being defined by at least one threshold.

According to a particular feature, said at least one radial offset value range comprises a first offset range (A) which is the range [0.75; 1.00] of the radial offset normalized with respect to the core radius of said multimode optical fiber or a sub-range of said range [0.75; 1.00].

This first offset range corresponds to a fiber index profile characteristic part that is sensitive to index profile change at the core-cladding interface.

According to a particular feature, a first ROD slope is computed for the first radial offset value range, and said step of selecting takes into account a first predetermined slope criterion defined as follow:
a first slope condition such that $s_A < -3.0 \times 10^{-3}$,
with $s_A$ the values of said first ROD slope expressed in ps/m/µm.

Thus it is possible to carry out the invention taking only one slope parameter into account in the selecting step. The computed slope $s_A$ is simply compared to a given slope threshold below which the multimode fiber is selected. In other words, above this slope threshold, the multimode fiber is rejected.

According to a particular feature, said at least one radial offset value range comprises:
- a second offset range (B) which is the range [0.40; 0.80] of the radial offset normalized with respect to the core radius of said multimode optical fiber or a sub-range of said range [0.40; 0.80] and
- a third offset range (C) which is the range [0.00; 0.25] of the radial offset normalized with respect to the core radius of said multimode optical fiber or a sub-range of said range [0.0; 0.25].

The second offset range is sensitive to any index profile deviation along the index gradient, for instance an offset of alpha parameter value that would influence the EMB delivered by the fiber. The third first offset range is sensitive to index profile deviation around the center of the fiber core (i.e. the optimal refractive index).

Thus the step of applying a linear fit on the ROD curve is carried out for one or several distinct radial offset value ranges each corresponding to a fiber index profile characteristic part. The first offset range corresponds to a refractive index profile region close to the core-cladding interface of the fibre; the third offset range corresponds to a refractive index profile region close to the central axis of the fibre; the second offset range corresponds to an intermediate refractive index profile region between the two aforesaid regions.

According to a particular feature, a second and third ROD slopes are computed respectively for the second and third radial offset value ranges, the first predetermined slope criterion further comprising:
a second slope condition such that $s_B < -1.4 \times s_C - 2.0 \times 10$,
with $s_B$, $s_C$ the values of said second and third ROD slopes expressed in ps/m/µm.

The method according to the invention can further take a set of two slope parameters into account. The second slope condition is then defined by an affine function defining a multi-parameter threshold (contrary to the first slope condition which is defined by a single-parameter threshold (constant function)).

This first predetermined slope criterion corresponds to an acceptance criterion for multimode fibers having a likely Effective Modal Bandwidth (EMB) at a single wavelength of 950 nm equal or higher than 2,700 MHz-km, i.e. a likely wide-band behavior.

According to a particular feature, said step of selecting takes into account a second predetermined slope criterion defined as follow:

a first slope condition such that $s_A < -6 \times 10^{-3}$, with $s_A$ the values of said first ROD slope expressed in ps/m/µm.

According to a particular feature, the second predetermined slope criterion (CROD2) further comprises:

a second slope condition such that $s_B < -1.4 \times 4.0 \times 10^{-3}$, with $s_B$, $s_C$ the values of first, second and third ROD slopes respectively expressed in ps/m/µm.

This second slope criterion corresponds to a narrow acceptance criterion for multimode fibers having a likely wide-band behavior. It can be combined with the first slope criterion to maximize the effectiveness of measurements by measuring in priority the fibers meeting these tighter criteria.

According to a particular feature, said at least one radial offset value range has a length equal to at least 0.04 of the normalized core radius.

A minimum tolerance of 1 micron imposed for multimode fibers of a core radius of 25 microns gives 0.04 of the normalized core radius. This allows having a sufficient number of points on the ROD curve (and so sufficient DMD data) for efficiently applying a linear fit on the ROD curve for the considered offset value ranges.

'Length' of an offset value range means the length comprised between the lower value and the upper value of said value range. For example, the length of the first offset range [0.75; 1.00] has a length of 0.25 (0.75 being the lower value and 1.00 being the upper value).

More specifically, said at least one radial offset value range has a length equal to at least 0.10 of the normalized core radius.

According to a particular feature, said core radius is 25 µm±1.25 µm and:

the first radial offset value range is comprised between 19 and 23 µm;

the second radial offset value range is comprised between 10 and 20 µm;

the third radial offset value range is comprised between 0 and 6 µm.

According to a particular feature, said at least one first multimode fiber specification parameter is an Effective Modal Bandwidth at the single wavelength of 850 nm and said at least one first predetermined specification criterion is that the Effective Modal Bandwidth is equal or higher than 4,700 MHz-km.

According to a particular feature, said at least one first multimode fiber specification parameter is over-filled launch bandwidth at the single wavelength of 850 nm and said at least one first predetermined specification criterion is that the over-filled launch bandwidth is equal or higher than 3,500 MHz-km.

According to a particular feature, the method further comprises the following steps, for each of said selected multimode optical fibers:

obtaining a second DMD plot using a measurement of dispersion modal delay carried out on said selected multimode optical fiber at a second single wavelength;

obtaining, from the second DMD plot, at least one second multimode fiber specification parameter (P2) at a second single wavelength;

and also comprises a step of sub-selecting the multimode optical fibers meeting a second predetermined specification criterion.

According to a particular feature, said at least one second multimode fiber specification parameter is an Effective Modal Bandwidth at the single wavelength of 950 nm and said at least one second predetermined specification criterion is that the Effective Modal Bandwidth is equal or higher than 2,700 MHz-km.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

5. LIST OF FIGURES

Other features of embodiments of the invention shall appear from the following description, given by way of indicative and non-exhaustive examples and from the appended drawings, of which.

6. DETAILED DESCRIPTION

In all of the figures of the present document, identical elements and steps are designated by the same numerical reference sign.

The method according to the invention described here below applies to OM4 multimode optical fibers of core diameter of 50 μm. The invention of course is not limited to this particular application and can be applied to any other kind of multimode fibers.

The general principle of the invention relies on using parameters of slopes computed on a curve representative of radial offset delay of multimode fibers to deduct the wideband probable behavior of these fibers from a DMD characterization restricted to a single wavelength.

Figure 1:
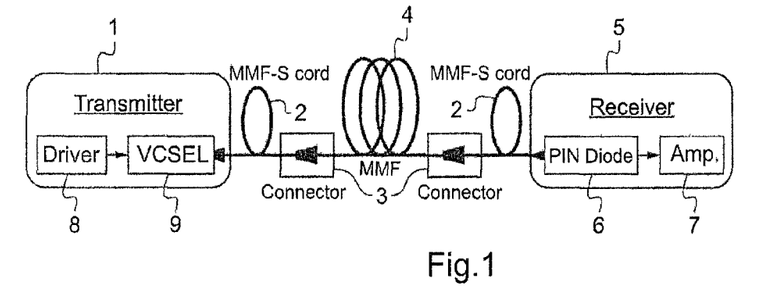
FIG. 1 shows an example of an optical communication system implementing a multimode optical fiber.

FIG. 1 shows an example of an optical communication system including a multimode fiber, object of the present selecting method. A multi Gigabits Ethernet optical communication system successively comprises a driver 8 of a transmitter 1, a VCSEL source 9 of a transmitter 1, a launch cord 2, a connector 3, a multimode fiber 4, a connector 3, a launch cord 2, a PIN diode 6 of a receiver 5, an amplifier 7 of a receiver 5. A digital signal at 10 Gbps or 25 Gbps is generated by the driver 8, which directly modulates the VCSEL source 9.

Figure 2:
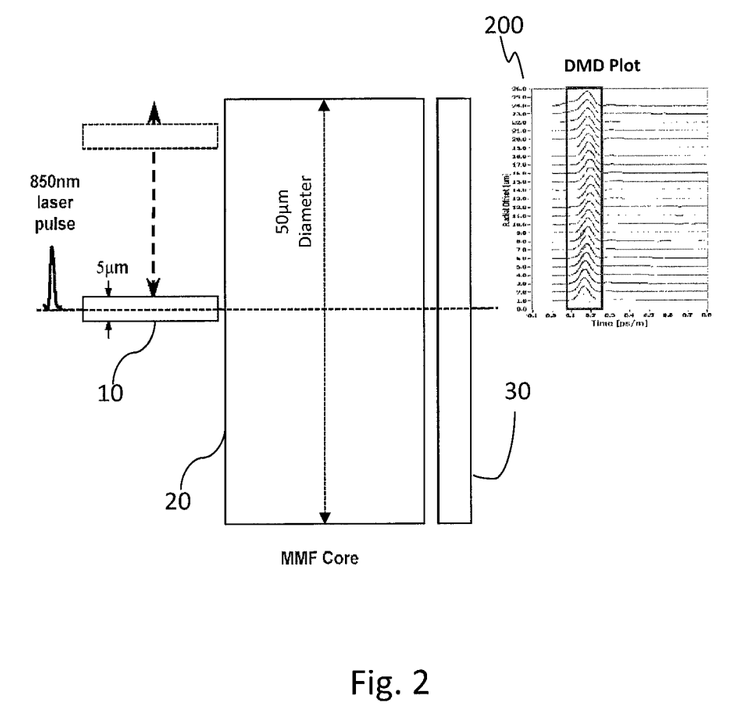
FIG. 2 provides a schematic illustration of the principle of DMD measurement process.

FIG. 2 illustrates the known principle of Differential-Mode-Delay (DMD) measurement, A DMD measurement consists in successively injecting into the multimode fiber a light pulse (ultrafast laser pulse) having a given single mode wavelength ($\lambda_1$=850 nm for example) with a different radial offset with respect to the optical core's center between each successive pulse. Delay of each pulse traversing the fibre is then measured after a given length (L) of fiber. Each light pulse is injected at a different radial offset value ("offset launch") r, from the central axis of the optical fiber where r=0 (i.e. optical core's center) to r=α, with a the core radius of the optical fiber. Each delay trace thus obtained corresponds to a given radial offset value.

More precisely, an optical reference pulse is emitted by a source at a single wavelength, e.g. 850 nm, and launched into the core 10 of a single-mode launch fiber, with a core diameter of 5 μm. From the end of the single-mode fiber, it is stepped across the core of a multimode fiber (MMF) 20 under test. The multimode fiber 20 has typically a core diameter of 50 μm. For each offset across the core (0 to 25 microns by increment of 1 micron for example), the output pulse is recorded by a high bandwidth optical receiver 30, giving the shape of the transmitted pulse, i.e. the DMD trace (also called a DMD measurement). The y-axis depicts the radial offset r in micrometers with respect to the optical core's center and the x-axis depicts the time in picoseconds or nanoseconds. For example, the DMD measurement process start with r=0 and ends with r=α. Usually, the difference in delay using the leading edge of the fastest pulse and the trailing edge (with a typical threshold of 25% of the maximum) of the slowest pulse passing through the fibre. Difference between fastest and slowest time considering specific ranges of offset launches are usually calculated to assess the modal dispersion of the multimode fiber 30. These time delay differences are called DMD values.

The example of DMD plot 200 illustrated on FIG. 2 shows a set of twenty-four recorded traces, each trace corresponding to a DMD measurement carried out for a given radial offset value r with respect to the optical core's center.

Figure 3:
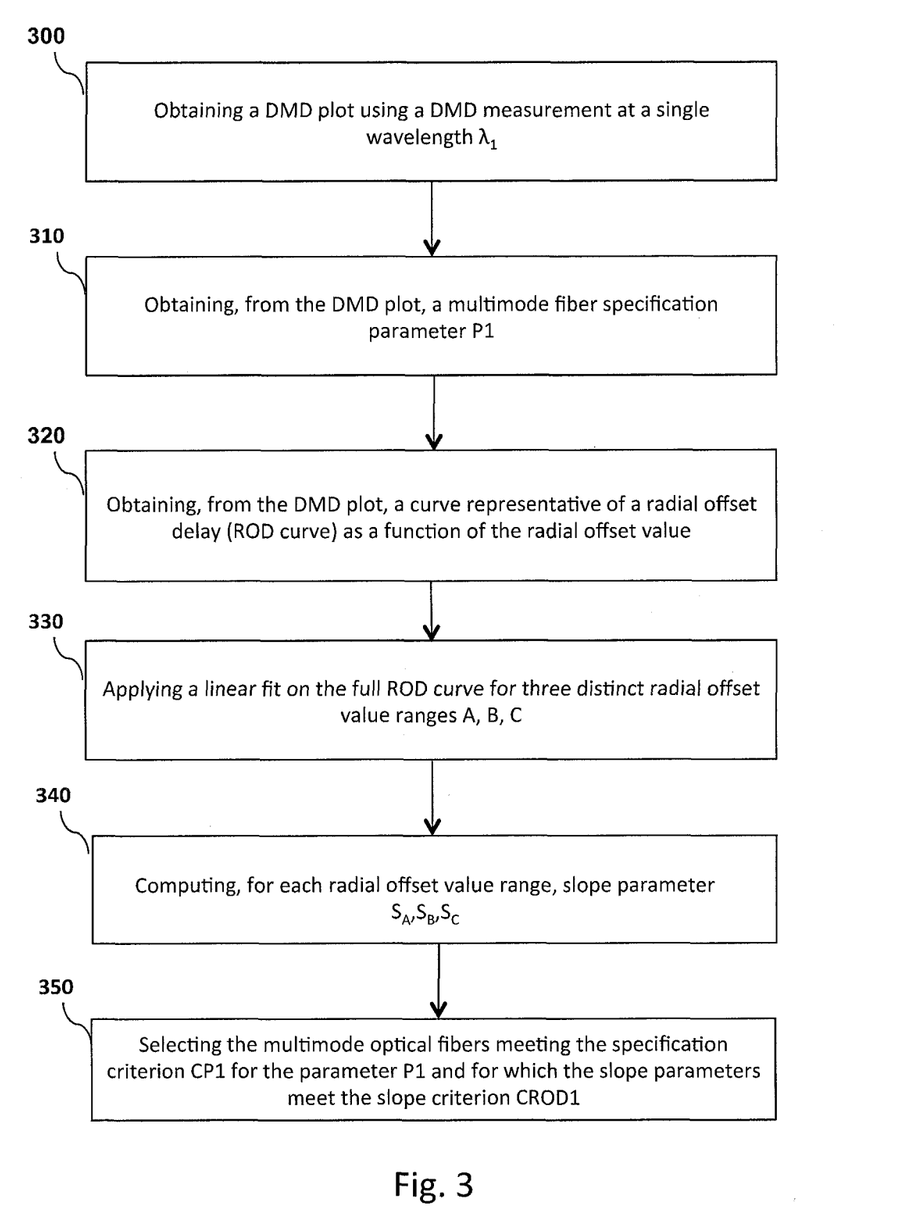
FIG. 3 provides a flowchart of a particular embodiment of the method according to the invention.

FIG. 3 illustrates a flowchart of a particular embodiment of the selecting method according to the invention.

Take a batch of multimode optical fibers at outlet of production. The multimode fibers have a standard radius of 25 μm (±1.25 μm). The aim of the method is to select, among the batch of fibers tested, those that satisfy OM4 standard criterion and have a high probability to exhibit an Effective Modal Bandwidth (EMB) equal or higher than 2,700 MHz-km at a wavelength of 950 nm.

Figure 4:
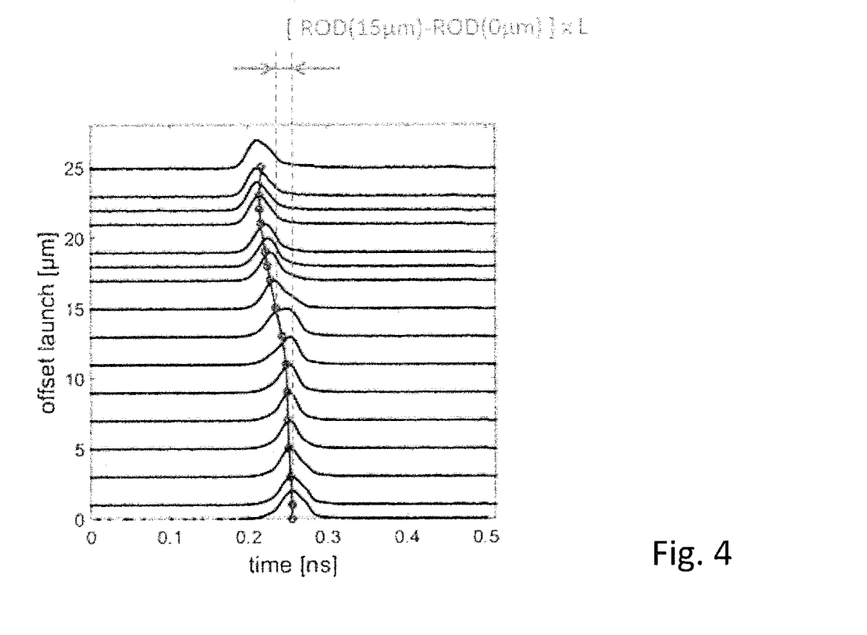
FIG. 4 depicts an example of a DMD graphical representation obtained for a multimode optical fiber, illustrating the calculation of a ROD curve according to a particular embodiment of the invention.

In step 300, a DMD measurement is carried out on each of the multimode fibers at wavelength of 850 nm ($\lambda_1$), as set forth in the FOTP-220 standard. At the end of this step, a DMD plot for each fiber tested is obtained. FIG. 4 shows an example of DMD plot obtained for a given fiber of the batch of fibers tested: x-axis depicts the time in nanoseconds and y-axis depicts the offset launch in micrometers.

The following steps 310 to 340 are executed for each DMD plot obtained, but they are thereafter described for a given DMD plot (for reasons of simplification of description of the invention).

In step 310, the DMD data of the DMD plot obtained in previous step are processed to obtain one or several OM4 fiber specification parameters representative of the fiber performance at 850 nm ($\lambda_1$). For example, an OM4 fiber specification parameter is the EMB at wavelength of 850 nm (specification parameter P1). The process to obtain the EMB at 850 nm from a DMD plot is well known to those skilled in the art. This process is illustrated for example in document TIA-455-220-A entitled "Differential Mode Delay Measurement of Multimode Fiber in the Time Domain" (January 2013 FOTP-220).

Another OM4 fiber specification parameter can be the OFL Bandwidth at wavelength of 850 nm (specification parameter P1'). The process to obtain the OFL Bandwidth at 850 nm from a DMD plot is well known to those skilled in the art. This process is illustrated for example in document A. Sengupta, "Calculated Modal Bandwidths of an OM4 Fiber and the Theoretical Challenges," IWCS'09, Charlotte, N.C., USA, p. 24 (2009).

Figure 5:
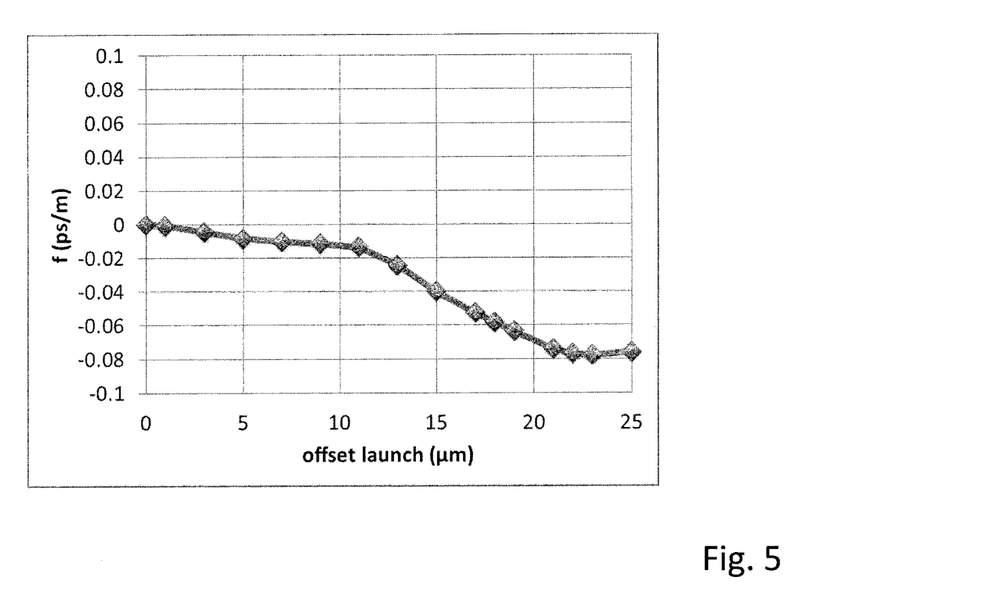
FIG. 5 graphically depicts a ROD curve obtained from DMD traces of FIG. 4 as a function of the radial offset value r, according to a particular embodiment of the invention.

In step 320, a curve representative of a radial offset delay (hereafter called ROD curve) as a function of the radial offset value (r) is computed from the DMD plot obtained in step 300, as illustrated in FIG. 5. The ROD is the average delay of a trace recorded during DMD measurements with respect to the average delay of a reference trace, for example the trace corresponding to the center offset launch (i.e. r=0 μm). The ROD can be calculated as the barycenter of the considered trace as follows:

$$ROD(r) = \frac{1}{L} \cdot \frac{\int_0^T t \cdot s_r(r) \cdot dt}{\int_0^T s_r(r) \cdot dt}$$

where:
$s_r(r)$ is the trace recorded at the offset value r during the DMD measurements over the [0,T] time window,
L is the tested multimode fiber length.

The ROD curve is the function $f(r)$ defined as follows:

$$f(r) = ROD(r) - ROD(r_{REF})$$

where $r_{REF}$ is the reference offset value, with $r_{REF}$=0 μm.

FIG. 4 shows what the radial offset delays are for a given DMD plot. Each circle materializes the average delay calculated for a given radial offset value. The example illustrated here corresponds to the average offset delay calculated for the DMD trace corresponding to a radial offset of 15 μm.

FIG. 5 shows the corresponding ROD curve, $f(r)$, obtained from the DMD plot of FIG. 4 when the reference offset value is set to 0 μm. The radial offset r is comprised between 0 and 25 μm (i.e. fiber core radius). The function $f(r)$ is expressed in ps/m.

Figure 6:
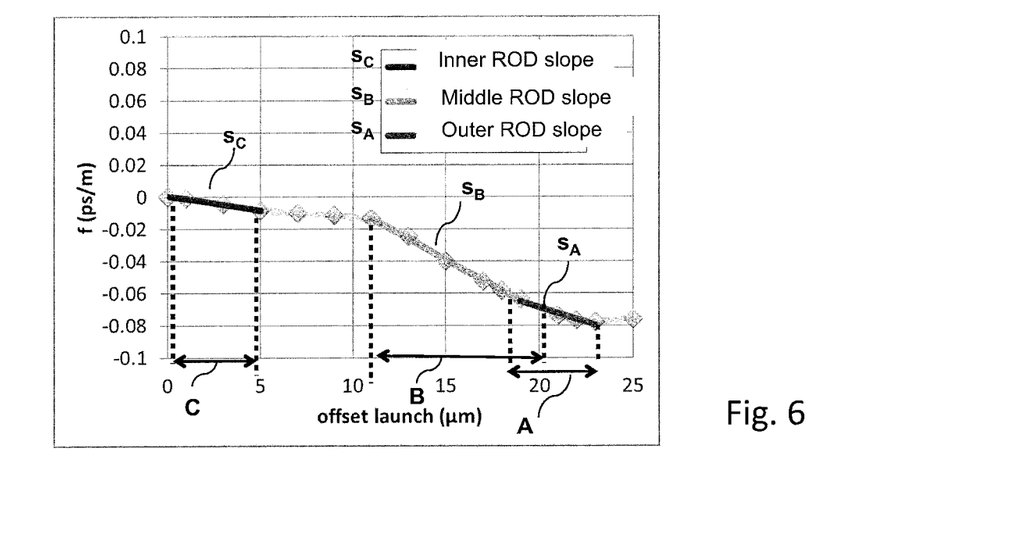
FIG. 6 shows an example of calculation of ROD slopes on the ROD curve of FIG. 5 as a function of chosen radial offset value ranges, according to a particular embodiment of the invention.

In step 330, a linear fit is applied on three distinct radial offset value ranges of the ROD curve obtained in previous step, as illustrated in FIG. 6:

a first offset range A, hereafter called "Outer offset range", corresponds to a fiber index profile region which is close to the core-cladding interface, such as 19≤r≤23 µm;

a third offset range C, hereafter called "Inner offset range", corresponds to a fiber index profile region which is close to the central axis of fibre, such as 0≤r≤6 µm;

a second offset range B, hereafter called "Middle offset range", corresponding to a intermediate fiber index profile region placed in-between the inner and outer offset range, such as 10≤r≤20 µm.

These three offset value ranges have been chosen because they correspond each to a multimode fiber index profile characteristic part having an influence on the Effective Modal Bandwidth assessment, namely:

the first offset range A is sensitive to the core-cladding interface, meaning the refractive index profile of the outer part of the gradient and the first microns in the surrounding cladding (that can be engineered with depressed trench or ring for instance);

the second offset range B is sensitive to any profile deviation along the index gradient, due to the value of alpha parameter (the shape of the index profile is governed by the alpha parameter), like for instance an offset of alpha parameter from that delivering an optimum EMB at 850 nm;

the third offset range C is sensitive to the refractive index profile deviation around the center of the fiber core (i.e. from the optimal refractive index at the center of the refractive index profile).

The offset range comprised between 24 and 25 µm in this example has been excluded because it basically corresponds to a noisy part vitiated by measurement errors. Of course this particular offset range can be accounted for in the steps of method without departing from the scope of the invention.

It should be noted that the second offset range can overlap one and/or the other of first and second offset ranges. The expression "between the first and third offset ranges" used here does not exclude a possible overlapping of the different offset ranges.

But more generally the ROD curve, $f(r)$, can be split into three radial offset value ranges as follows:

the first offset range A is the range [0.75 to 1.00] of the radial offset normalized with respect to the core radius of said multimode optical fiber (r/a), or a sub-range of the range [0.75 to 1.00], the second offset range B is the range [0.40 to 0.80] of the radial offset normalized with respect to the core radius of said multimode optical fiber (r/a), or a sub-range of the range [0.40 to 0.80];

a third offset range C is the range [0.00 to 0.25] of the radial offset normalized with respect to the core radius of said multimode optical fiber (r/a), or a sub-range of the range [0.00 to 0.25].

The number of offset ranges used in the present example is three. The Invention is not limited to this example, but it can also be implemented with a higher or a lower number of offset ranges without departing from the scope of the invention. The method according to the invention can be implemented with only one offset range (and so only one slope condition as explained below) if this offset range is the Outer offset range A. The inventors have identified that a number of three offset ranges gives a satisfying rate of selection according to the method of embodiments of the present disclosure of wide-band multimode fibers actually meeting the required performance specifications.

The length of the first, second and third offset ranges (A, B, C) has respectively a range length of 0.25, 0.40 and 0.25 of the radial offset normalized. By 'length' we mean the length comprised between the lower value and the upper value of the considered value range. More generally, each offset value range according to the present disclosure has a length between the lower value and the upper value of at least 0.04 of the normalized core radius. In fact a minimum tolerance of 1 micron imposed for a core radius of 25 microns gives 0.04 of the normalized core radius. This minimal value of 0.04 ensures to have a sufficient number of points on the ROD curve (and so sufficient DMD data) for efficiently applying a linear fit on the ROD curve for the considered offset value ranges.

In step 340, a radial offset delay slope is obtained from the linear fit applied for each radial offset value range set in previous step, hereafter called ROD slope.

The ROD slope is the slope given by the linear fit for a given radial offset range. The linear fit applied to the ROD curve ($f(r)$) approximates the ROD curve over the specific Inner, Middle and Outer offset ranges, by means of an affine function such as:

$$f(r) = \text{ROD Slope} \times r + \text{Constant}$$

So the linear fit gives two coefficients: the slope 'ROD Slope' and the offset 'Constant'.

The ROD slopes obtained at the end of this step for the Inner, Middle and Outer offset ranges are respectively called "Inner ROD slope" (or "ROD slope Inner in figures), $s_A$, "Middle ROD slope" (or "ROD slope Middle" in figures), $s_B$, and "Outer ROD slope" (or "ROD slope Outer" in figures), $s_C$.

These slope parameters, calculated from the DMD measurements at 850 nm, are used according to the invention to assess the wide-band performance of fibers at 950 nm.

In step 350, after executing the previous steps 300 to 340 for each multimode fiber of the batch of fibers, the multimode fibers that satisfy the following criteria are selected:

the multimode fibers meeting a predetermined specification criterion CP1 for the OM4 fiber specification parameter P1 obtained in step 310, and the multimode fibers for which the inner, middle and outer ROD slopes computed in step 340 meet at least one predetermined slope criterion (hereafter called CROD1 or CROD2).

For example a fiber is selected if the EMB at 850 nm (P1) calculated in step 310 for that fiber is equal or higher than 4,700 MHz-km (CP1) and if the values of inner ($s_A$), middle ($s_B$) and outer ($s_C$) ROD slopes computed in step 340 meet a first predetermined slope criterion, hereafter called CROD1.

To meet this first slope criterion CROD1 according to the present disclosure, the slope parameters $s_A$, $s_B$, $s_C$ must verify the following slope conditions:

a first slope condition such that $s_A \leq -3.0 \times 10^{-3}$ ps/m/µm, and a second slope condition such that $s_B < -1.4 \times s_C - 2.0 \times 10^{-3}$ ps/m/µm.

If these slope conditions are met, this means that the first slope criterion CROD1 is met for the considered fiber. This first slope criterion corresponds to an "acceptance criterion" for multimode fibers having a probable Effective Modal Bandwidth (EMB) at a single wavelength of 950 nm equal or higher than 2,700 MHz-km.

Thus this specification criterion CP1 and slope criterion CROD1 aim to select fibers that exhibit OM4 performances at 850 nm and EMB higher than 2,700 MHz-km at 950 nm.

Figure 12:
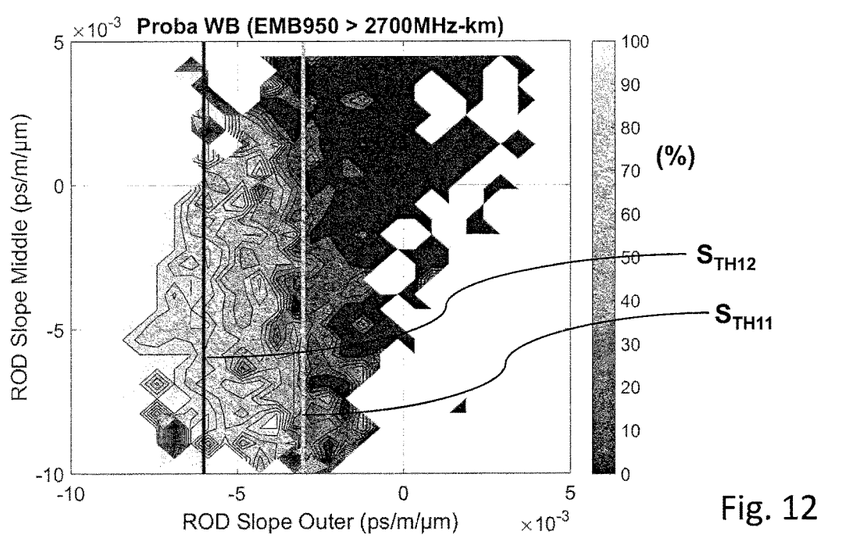
FIGS. 12 and 13 graphically depict the probability distribution of the OM4 fibers to be actually wide-band as a function of slope parameters.

The first slope condition for CROD1 is illustrated for instance in FIG. 12 by the slope threshold $S_{TH11}$. This slope condition is defined by a constant function equal to $-3.0 \times 10^{-3}$ ps/m/μm. The second slope condition for CROD1 is illustrated for instance in FIG. 13 by the threshold $S_{TH21}$. This slope condition is defined by an affine function including two slope parameters $S_B$ and $s_C$ (in other words, this slope condition is defined by a multi-parameter threshold). The present disclosure is not limited to the use of constant and affine functions; more complex rules using $s_A$, $s_B$ and $s_C$ can be used.

A second predetermined slope criterion (CROD2) can be also tested for each optical fiber, independently or further the first slope criterion. This second acceptance criterion is stricter than the first slope criterion (CROD1).

To meet this second slope criterion CROD2 according to the invention, the slope parameters $s_A$, $s_B$, $s_C$ must verify the following slope conditions;

a first slope condition such that $s_A < -6 \times 10^{-3}$ ps/m/μm; and a second slope condition such that $s_B < -1.4 \times s_C - 4.0 \times 10^{-3}$ ps/m/μm.

If these slope conditions are verified, the second slope criterion CROD2 is met for the concerned fiber, meaning that the concerned fiber is likely to exhibit an EMB higher than 2,700 MHz-km at 950 nm with a high probability (a probability larger than 90% to actually meet OM4 specifications and offer an EMB at 950 nm equal or higher than 2,700 MHz-km).

This second slope criterion CROD2 has conditions on slope values that are narrower than that of the first slope criterion CROD1.

The first slope condition for CROD2 is illustrated for instance in FIG. 12 by the slope threshold $S_{TH21}$. This slope condition is defined by a constant function equal to $-6.0 \times 10^{-3}$ ps/m/μm. The second slope condition for CROD2 is illustrated for instance in FIG. 13 by the threshold $S_{TH22}$. This slope condition is defined by an affine function including two slope parameters $s_B$ and $s_C$ (in other words, this slope condition is defined by a multi-parameter threshold). The present disclosure is not limited to the use of constant and affine functions; more complex rules using $s_A$, $s_B$ and $s_C$ can be used.

The idea of this particular embodiment is to pre-select the fibers that have the highest likelihood to meet the requirements at 950 nm in order to prioritize or limit the actual DMD measurements at 950 nm to these fibers.

It should be noted that each slope condition discussed in the present example is defined by a single-slope threshold (first slope condition) or multi-slope threshold (second slope condition). Of course, it is possible to define a slope condition by means of two thresholds, a minimal threshold and a maximal threshold for instance, without departing from the scope of the invention. In addition, it is important to note that the slope conditions can be adapted as a function of range of wavelengths to cover and the wavelength used for the DMD measurements.

Figure 7:
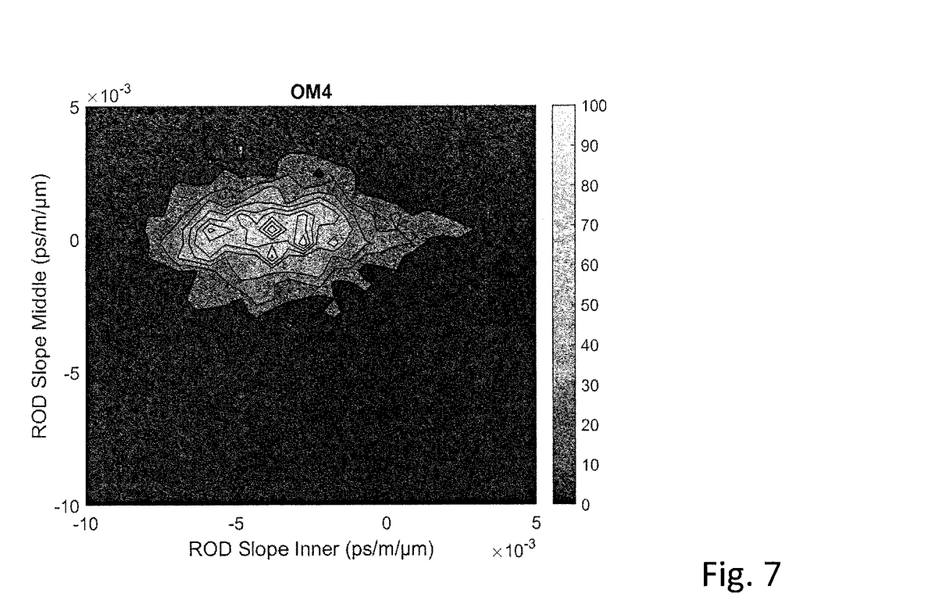
FIGS. 7 and 8 graphically depict the normalized distribution of ROD slope parameters for a set of multimode fibers meeting OM4 requirements (OM4 fibers)
Figure 8:
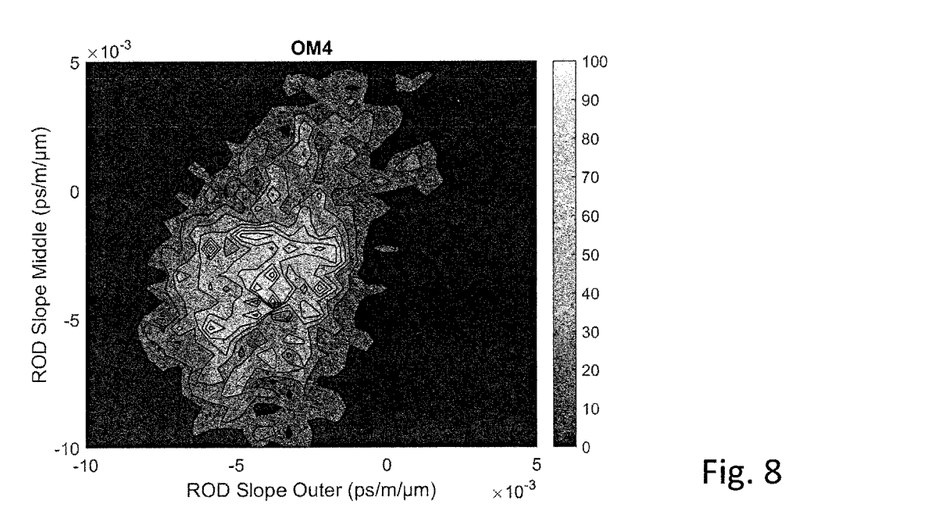

In order to assess the efficiency of the criteria discussed above, actual DMD measurements at both 850 and 950 nm have been performed on a set of fibers meeting OM4 requirements (hereafter called "OM4 fibers"). FIGS. 7 and 8 graphically depict the normalized distribution of slope parameters (inner, middle and outer ROD Slope) for the set of OM4 fibers, thus meeting the specification criterion CP1. The left-hand y-axis depicts the values of Middle ROD slope and the x-axis depicts the values of Inner ROD slope (FIG. 7) or the Outer ROD slope (FIG. 8). Note the coefficient ×10 in x-axis and y-axis. DMD measurements of the set of multimode fibers have been performed at a wavelength of 850 nm. The Inner, Middle and Outer ROD Slopes have been calculated using the above-mentioned offset ranges A (0≤r≤6 μm), B (10≤r≤20 μm), C (19≤r≤23 μm).

Figure 10:
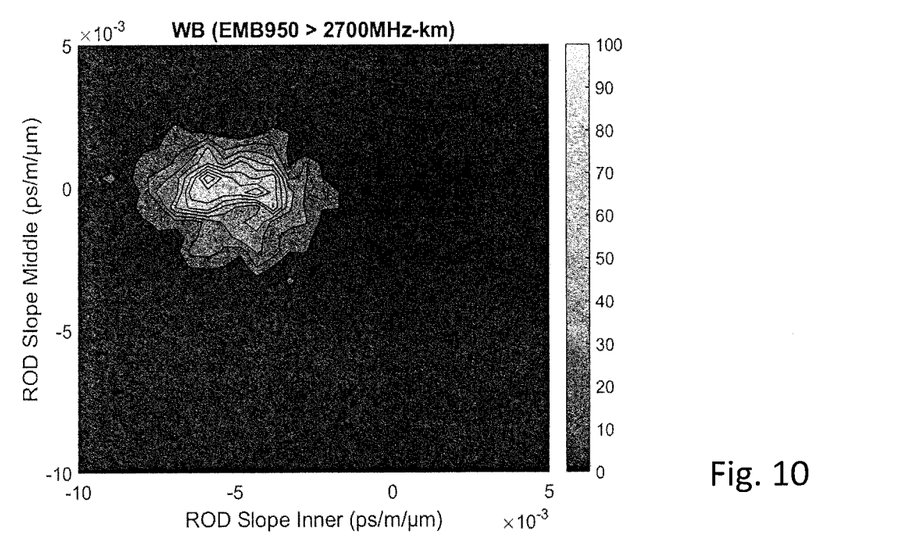
FIGS. 10 and 11 graphically depict the normalized distribution of ROD slope parameters for the set of OM4 fibers of FIGS. 7 and 8 restricted to the fibers exhibiting an Effective Modal Bandwidth higher than 2,700 MHz-km at 950 nm.
Figure 11:
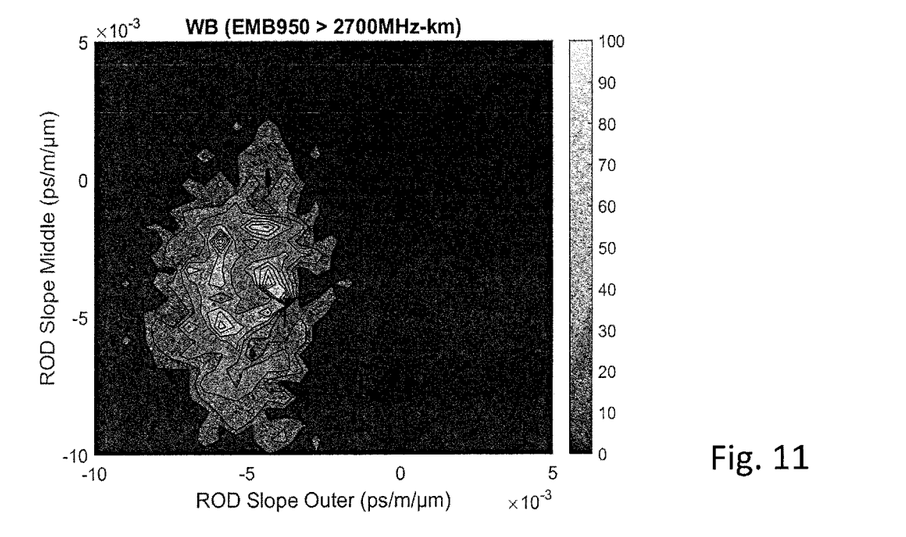

FIGS. 10 and 11 graphically depict the normalized distribution of slope parameters (inner, middle and outer ROD Slope) for the set of OM4 fibers restricted to fibers also exhibiting an EMB higher than 2,700 MHz-km at 950 nm. The left-hand y-axis depicts the Middle ROD slope and the x-axis depicts the Inner ROD slope (FIG. 10) or the Outer ROD slope (FIG. 11). Note the coefficient $\times 10^{-3}$ in x-axis and y-axis.

The maximum occurrence of the normalized distribution of FIGS. 7, 8, 10 and 11 are arbitrary set at 100.

Figure 9:
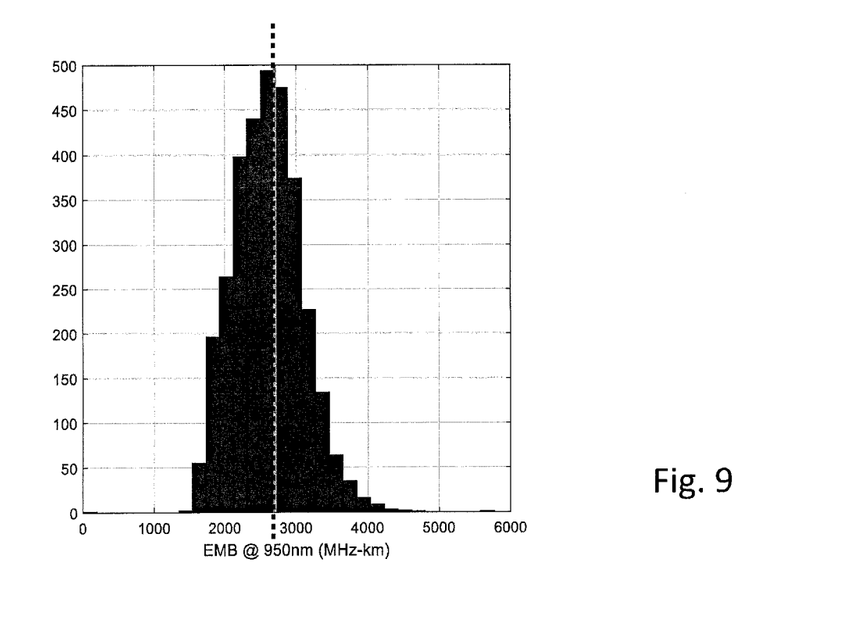
FIG. 9 illustrates a histogram showing the distribution of the set of OM4 fibers as a function of the Effective Modal Bandwidth measured at a wavelength of 950 nm.

FIG. 9 reports the distribution of EMB at 950 nm of this set of OM4 fibers. The OM4 fibers to be selected are those that exhibit an EMB equal or larger than 2,700 MHz-km at 950 nm (i.e. those placed on right side of the dashed line on FIG. 9).

Figure 13:
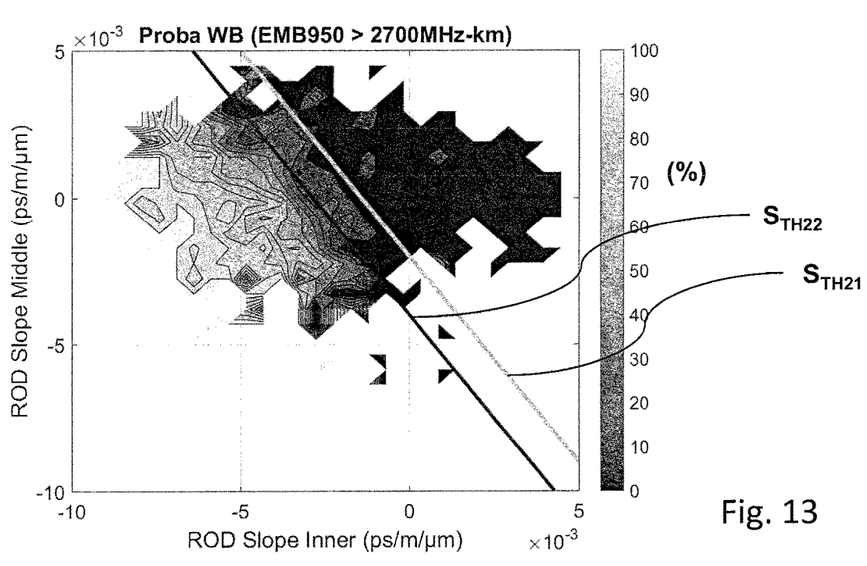

FIGS. 12 and 13 graphically depict the probability distribution of the OM4 fibers to be actually wide-band as a function of Inner, Middle and Inner ROD slopes. These two graphics have been established each by means of a ratio of the number of wide-band fibers (FIGS. 10 and 11) over the number of OM4 fibers (FIGS. 7 and 8) in the [ROD Slope Inner; ROD Slope Middle] space (FIG. 12) and in the [ROD Slope Middle; ROD Slope Outer] space (FIG. 13). The left-hand y-axis depicts the values of Middle ROD slope and the x-axis depicts the values of Inner ROD slope (FIG. 12) or the Outer ROD slope (FIG. 13). Note the coefficient $\times 10^{-3}$ in x-axis and y-axis. The value computed for a given pair of Middle-Inner ROD slopes (FIG. 12) or a given pair of Middle-Outer ROD slopes (FIG. 13) corresponds to the probability (expressed in % in shades of gray in the right-hand y-axis) that the tested fiber is wide band OM4, that is meets the OM4 specification criterion (CP1) and has an EMB upper than 2,700 MHz·km at 950 nm. These graphs highlight acceptable and non-acceptable areas in terms of slope parameters characterized by a percentage that the fibers have to exhibit wide-band OM4 behavior as defined in the present invention.

Thus, the graphics of FIGS. 12 and 13 enable to assess the probability of an OM4 fiber to be actually wide-band only from the Inner, Middle and Outer ROD Slopes measured at 850 nm. These graphics can be then used to decide to carry out the actual measurements at 950 nm or not.

We note that the distribution of the wide-band OM4 fibers (meaning OM4 fibers exhibiting an EMB>2,700 MHz-km at 950 nm) is more confined to the left in the [ROD Slope Inner; ROD Slope Middle] space, and to the bottom left in the [ROD Slope Middle; ROD Slope Outer] space. That demonstrates that a selection over the three above-mentioned offset ranges A, B, C helps to detect potential wide-band OM4 fibers out of the DMD characterization wavelength at 850 nm.

Accordingly it appears for instance that the multimode fibers having slopes values such as $[S_A < -6 \times 10^{-3}$ ps/m/μm] and $[S_B < -1.4 \times S_C - 4 \times 10^{-3}$ ps/m/μm] exhibit a probability larger than 90% to actually meet OM4 specifications and offer an EMB at 950 nm equal or higher than 2,700 MHz-km. Thus, one can select the fibers of the batch of fiber that exhibit a probability larger than 90%. Of course, this threshold of 90% is an example and other thresholds can be set for the implementation of the method as a function of tradeoffs we want to do.

It also appears for instance that the multimode fibers having slopes values such as $[S_A>-3\times10^{-3}$ ps/m/μm] AND $[S_B>-1.4\times S_C-2\times10^{-3}$ ps/m/μm] have less than 6% chance to have an EMB at 950 nm equal or higher than 2,700 MHz-km. The cost of measurement at 950 nm can be saved for these fibers that do not meet the performance probabilistic criterion.

It has been shown that approximately 28% of the measurements at 950 nm can be avoided thanks to the method of the invention.

The invention is not limited to this particular embodiment, and can also be implemented with a higher or a lower number of slope conditions without departing from the scope of the invention. For example, the method according to the invention can be simply implemented with only one slope condition if this slope condition is a condition regarding the Outer ROD slope $S_A$. In that case, the probability to actually meet OM4 specifications and offer an EMB at 950 nm equal or higher than 2,700 MHz-km may be smaller than that when two slope conditions are used in the method.

By the way, another predetermined specification criterion CP1' for the OM4 fiber specification parameter P1' obtained in step 310 may be also verified in fiber selecting step: for example a fiber is selected if the OFL Bandwidth at 850 nm (P1') obtained in step 310 for that fiber is equal or higher than 3,500 MHz-km (CP1').

In a particular embodiment, the method can then comprise (not shown in FIG. 3), for each of the multimode optical fibers selected in previous step 350:

obtaining a second DMD plot using a measurement of dispersion modal delay (DMD) carried out on said selected multimode optical fiber at a single wavelength of 950 nm ($\lambda_2$);

obtaining, from the second DMD plot, one or several OM4 fiber specification parameter P2 representative of the fiber performance at the wavelength of 950 nm ($\lambda_2$);

sub-selecting the multimode optical fibers meeting a second predetermined specification criterion CP2 for the specification parameter P2: for example the EMB at 950 nm (P2) must be equal or higher than 2,700 MHz-km (CP2).

Figure 14:
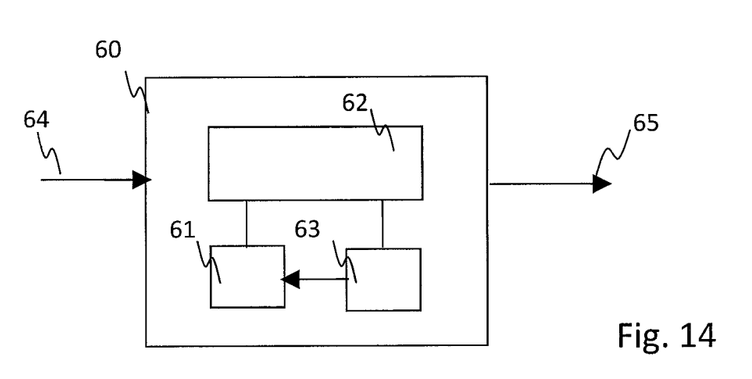
FIG. 14 shows the simplified structure of a selecting device according to a particular embodiment of the invention.

FIG. 14 shows the simplified structure of a selecting device 60 according to a particular embodiment of the invention, which carries out the selecting method shown in FIG. 3 for example.

The device 60 comprises a non-volatile memory 61 (e.g. a read-only memory (ROM) or a hard disk), a volatile memory 63 (e.g. a random access memory or RAM) and a processor 62. The non-volatile memory 61 is a non-transitory computer-readable carrier medium. It stores executable program code instructions, which are executed by the processor 62 in order to enable implementation of the selecting method described above in relation with FIG. 3.

Upon initialization, the aforementioned program code instructions are transferred from the non-volatile memory 61 to the volatile memory 63 so as to be executed by the processor 62. The volatile memory 63 likewise includes registers for storing the variables and parameters required for this execution.

The device 60 receives as inputs DMD measurement data 64 for each multimode fiber tested. The device 60 generates as outputs, for each multimode fiber tested:

a level of probability (e.g. a percentage) that the fiber meets the above-mentioned OM4 specification and wide-band performance criteria, and/or an indication to select or not this fiber for a further EMB actual measurement.

All the steps of the above steering method can be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or by a dedicated machine or component, such as an FPGA (Field Programmable Gate Array), an ASIC (Application-Specific Integrated Circuit) or any dedicated hardware component.

In other words, the invention is not limited to a purely software-based implementation, in the form of computer program instructions, but that it can also be implemented in hardware form or any form combining a hardware portion and a software portion.

Although the present disclosure has been described with reference to examples of predetermined slop criterions with specific conditions, workers skilled in the art will recognize that changes may be made in form and detail without departing from the scope of the disclosure and/or the appended claims. Indeed, the above specific conditions (threshold values for instance) can be adapted to deduct the probable behavior of multimode fibers for a wavelength range other than 850-950 nm, and from a DMD characterization carried out at a wavelength other than 850 nm.

The invention claimed is:

1. A method for selecting wide-band multimode optical fibers from a single wavelength, the method comprising the following steps of, for each multimode optical fiber:

injecting and measuring a pulsed light of a single wavelength into one or more wide-band multimode optical fibers;

obtaining, with a processor, a first DMD plot from the injected pulsed light of the single wavelength of the one or more wide-band multimode fibers and using a measurement of dispersion modal delay (DMD) carried out on said multimode optical fiber at a first single wavelength ($\lambda_1$), the DMD plot comprising a plurality of traces each recorded at a different radial offset value r, from an axis of said multimode optical fiber where r=0 to a radial offset value r=a, where a is the core radius of said multimode optical fiber, obtaining, with the processor, from the first DMD plot, at least one first multimode fiber specification parameter (P1) at said single wavelength, and for each multimode optical fiber:

obtaining, with the processor, from the first DMD plot, a curve representative of a radial offset delay of said multimode optical fiber, called ROD curve, as a function of the radial offset value r, 0≤r≤a;

applying, with the processor, a linear fit on the ROD curve for at least one radial offset value range (A, B, C);

obtaining, with the processor, from said linear fit applied for each radial offset value range, a radial offset delay slope defined as ROD slope ($s_A$, $s_B$, $s_C$);

and selecting, with the processor, the multimode optical fibers meeting a first predetermined specification criterion (CP1) for said at least one first multimode fiber performance parameter (P1), and for which said at least one computed ROD slope meets at least one predetermined slope criterion (CROD1, CROD2).

2. The method according to claim 1, wherein, for each predetermined slope criterion, a slope condition is verified for a computed ROD slope and/or a set of at least two computed ROD slopes of said at least one computed ROD slope, said slope condition being defined by at least one threshold.

3. The method according to claim 1, wherein said at least one radial offset value range comprises a first offset range (A) which ranges from 0.75 to 1.00 of the radial offset normalized with respect to the core radius of said multimode optical fiber or a sub-range of said range from 0.75 to 1.00.

4. The method according to claim 3, wherein a first ROD slope ($s_A$) is computed for the first radial offset value range (A), and wherein said step of selecting takes into account a first predetermined slope criterion (CROD1) defined as follow:
   a first slope condition such that $s_A < -3.0 \times 10^{-3}$,
   with $s_A$ the values of said first ROD slope expressed in ps/m/μm.

5. The method according to claim 4, wherein said at least one radial offset value range comprises:
   a second offset range (B) which ranges from 0.4 to 0.8 of the radial offset normalized with respect to the core radius of said multimode optical fiber or a sub-range of from 0.4 to 0.8 and
   a third offset range (C) which ranges from 0.0 to 0.25 of the radial offset normalized with respect to the core radius of said multimode optical fiber or a sub-range of from 0.0 to 0.25.

6. The method according to claim 5, wherein a second and third ROD slopes ($s_B$, $s_C$) are computed respectively for the second and third radial offset value ranges (B, C), the first predetermined slope criterion (CROD1) further comprising:
   a second slope condition such that $s_B < -1.4 \times s_C - 2.0 \times 10^{-3}$
   with $s_B$, $s_C$ the values of said second and third ROD slopes expressed in ps/m/μm.

7. The method according to claim 4, wherein said step of selecting takes into account a second predetermined slope criterion (CROD2) defined as follow:
   a first slope condition such that $s_A < -6 \times 10^{-3}$,
   with $s_A$ the values of said first ROD slope expressed in ps/m/μm.

8. The method according to claim 7, wherein the second predetermined slope criterion (CROD2) further comprises:
   a second slope condition such that $s_B < -1.4 \times s_C - 4.0 \times 10^{-3}$, and
   with $s_B$, $s_C$ the values of first, second and third ROD slopes respectively expressed in ps/m/μm.

9. The method according to claim 3, wherein said at least one radial offset value range has a length equal to at least 0.04 of the normalized core radius.

10. The method according to claim 3, wherein said at least one radial offset value range has a length equal to at least 0.10 of the normalized core radius.

11. The method according to claim 5, wherein said core radius is 25 μm±1.25 μm and:
   the first radial offset value range (A) is comprised between 19 and 23 μm;
   the second radial offset value range (B) is comprised between 10 and 20 μm;
   the third radial offset value range (C) is comprised between 0 and 6 μm.

12. The method according to claim 1, wherein said at least one first multimode fiber specification parameter (P1) is an Effective Modal Bandwidth (EMB) at the single wavelength of 850 nm and said at least one first predetermined specification criterion (CP1) is that the Effective Modal Bandwidth is equal or higher than 4,700 MHz-km.

13. The method according to claim 1, wherein said at least one first multimode fiber specification parameter (P1) is over-filled launch (OFL) bandwidth at the single wavelength of 850 nm and said at least one first predetermined specification criterion (CP1) is that the over-filled launch bandwidth is equal or higher than 3,500 MHz-km.

14. The method according to claim 1, further comprising the following steps, for each of said selected multimode optical fibers:
   obtaining a second DMD plot using a measurement of dispersion modal delay (DMD) carried out on said selected multimode optical fiber at a second single wavelength ($\lambda_2$);
   obtaining, from the second DMD plot, at least one second multimode fiber specification parameter (P2) at a second single wavelength ($\lambda_2$);
and comprising a step of sub-selecting the multimode optical fibers meeting a second predetermined specification criterion (CP2).

15. The method according to claim 14, wherein said at least one second multimode fiber specification parameter (P2) is an Effective Modal Bandwidth (EMB) at the single wavelength of 950 nm and said at least one second predetermined specification criterion (CP2) is that the Effective Modal Bandwidth is equal or higher than 2,700 MHz-km.

16. An apparatus configured for injecting and measuring a pulsed light of a single wavelength into one or more wide-band multimode optical fibers and a non-transitory computer-readable carrier medium embodying and storing a computer program that is executable in a computing device, the program comprising:
   program code for selecting wide-band multimode optical fibers from a single wavelength;
   program code for obtaining a first DMD plot from one or more optical fibers injected with the pulsed light of a single wavelength using a measurement of dispersion modal delay (DMD) carried out on said multimode optical fiber at a first single wavelength ($\lambda_1$), the MD plot comprising a plurality of traces each recorded at a different radial offset value r, from an axis of said multimode optical fiber where r=0 to a radial offset value r=a, where a is the core radius of said multimode optical fiber,
   program code for obtaining from the first DMD plot, at least one first multimode fiber specification parameter (P1) at said single wavelength, and
for each multimode optical fiber:
   program code for obtaining from the first DMD plot, a curve representative of a radial offset delay of said multimode optical fiber, called ROD curve, as a function of the radial offset value r, 0≤r≤a;
   program code for applying a linear fit on the ROD curve for at least one radial offset value range (A, B, C);
   program code for obtaining from said linear fit applied for each radial offset value range, a radial offset delay slope defined as ROD slope ($s_A$, $s_B$, $s_C$);
and selecting the multimode optical fibers meeting a first predetermined specification criterion (CP1) for said at least one first multimode fiber performance parameter (P1), and for which said at least one computed ROD slope meets at least one predetermined slope criterion (CROD1, CROD2).

17. The apparatus and non-transitory computer-readable carrier medium according to claim 16, wherein, for each predetermined slope criterion, a slope condition is verified for a computed ROD slope and/or a set of at least two computed ROD slopes of said at least one computed ROD slope, said slope condition being defined by at least one threshold.

18. The apparatus and non-transitory computer-readable carrier medium according to claim 16, wherein said at least one radial offset value range comprises a first offset range (A) which ranges from 0.75 to 1.00 of the radial offset normalized with respect to the core radius of said multimode optical fiber or a sub-range of said range from 0.75 to 1.00.

19. The apparatus and non-transitory computer-readable carrier medium according to claim 18, wherein a first ROD slope ($s_A$) is computed for the first radial offset value range (A), and wherein said step of selecting takes into account a first predetermined slope criterion (CROD1) defined as follow:
a first slope condition such that $s_A < -3.0 \times 10^{-3}$,
with $s_A$ the values of said first ROD slope expressed in ps/m/μm.

20. The apparatus and non-transitory computer-readable carrier medium according to claim 19, wherein said at least one radial offset value range comprises:
a second offset range (B) which ranges from 0.4 to 0.8 of the radial offset normalized with respect to the core radius of said multimode optical fiber or a sub-range of from 0.4 to 0.8 and
a third offset range (C) which ranges from 0.0 to 0.25 of the radial offset normalized with respect to the core radius of said multimode optical fiber or a sub-range of from 0.0 to 0.25.

21. The apparatus and non-transitory computer-readable carrier medium according to claim 20, wherein a second and third ROD slopes ($s_B$, $s_C$) are computed respectively for the second and third radial offset value ranges (B, C), the first predetermined slope criterion (CROD1) further comprising:
a second slope condition such that $s_B < -1.4 \times s_C - 2.0 \times 10^{-3}$
with $s_B$, $s_C$ the values of said second and third ROD slopes expressed in ps/m/μm.

22. The apparatus and non-transitory computer-readable carrier medium according to claim 19, wherein said step of selecting takes into account a second predetermined slope criterion (CROD2) defined as follow:
a first slope condition such that $s_A < -6 \times 10^{-3}$,
with $s_A$ the values of said first ROD slope expressed in ps/m/μm.

23. The apparatus and non-transitory computer-readable carrier medium according to claim 22, wherein the second predetermined slope criterion (CROD2) further comprises:
a second slope condition such that $s_B < -1.4 \times s_C - 4.0 \times 10^{-3}$, and
with $s_B$, $s_C$ the values of first, second and third ROD slopes respectively expressed in ps/m/μm.

24. The apparatus and non-transitory computer-readable carrier medium according to claim 18, wherein said at least one radial offset value range has a length equal to at least 0.04 of the normalized core radius.

25. The apparatus and non-transitory computer-readable carrier medium according to claim 18, wherein said at least one radial offset value range has a length equal to at least 0.10 of the normalized core radius.

26. The apparatus and non-transitory computer-readable carrier medium according to claim 20, wherein said core radius is 25 μm±1.25 μm and:
the first radial offset value range (A) is comprised between 19 and 23 μm;
the second radial offset value range (B) is comprised between 10 and 20 μm;
the third radial offset value range (C) is comprised between 0 and 6 μm.

27. The apparatus and non-transitory computer-readable carrier medium according to claim 16, wherein said at least one first multimode fiber specification parameter (P1) is an Effective Modal Bandwidth (EMB) at the single wavelength of 850 nm and said at least one first predetermined specification criterion (CP1) is that the Effective Modal Bandwidth is equal or higher than 4,700 MHz-km.

28. The apparatus and non-transitory computer-readable carrier medium according to claim 16, wherein said at least one first multimode fiber specification parameter (P1) is over-filled launch (OFL) bandwidth at the single wavelength of 850 nm and said at least one first predetermined specification criterion (CP1) is that the over-filled launch bandwidth is equal or higher than 3,500 MHz-km.

29. The apparatus and non-transitory computer-readable carrier medium according to claim 16, further comprising the following steps, for each of said selected multimode optical fibers:
obtaining a second DMD plot using a measurement of dispersion modal delay (DMD) carried out on said selected multimode optical fiber at a second single wavelength ($\lambda_2$);
obtaining, from the second DMD plot, at least one second multimode fiber specification parameter (P2) at a second single wavelength ($\lambda_2$);
and comprising a step of sub-selecting the multimode optical fibers meeting a second predetermined specification criterion (CP2).

30. The apparatus and non-transitory computer-readable carrier medium according to claim 29, wherein said at least one second multimode fiber specification parameter (P2) is an Effective Modal Bandwidth (EMB) at the single wavelength of 950 nm and said at least one second predetermined specification criterion (CP2) is that the Effective Modal Bandwidth is equal or higher than 2,700 MHz-km.

* * * * *

UNITED STATES PATENT AND TRADEMARK OFFICE
CERTIFICATE OF CORRECTION

PATENT NO.         : 10,382,124 B2
APPLICATION NO.    : 15/778709
DATED              : August 13, 2019
INVENTOR(S)        : Denis Molin Page 1 of 1

It is certified that error appears in the above-identified patent and that said Letters Patent is hereby corrected as shown below:

In the Claims

Column 16, Line 42, Claim 16 after "wavelength($\lambda_1$)," delete "the MD" and insert --the DMD--

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*